A. K. EDDOWES.
WINDOW SASH.
No. 73,586.  Patented Jan. 21, 1868.
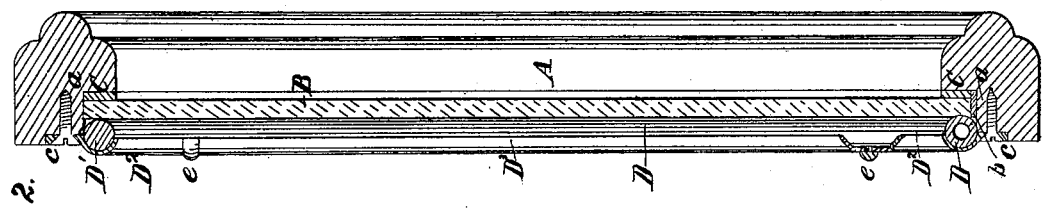
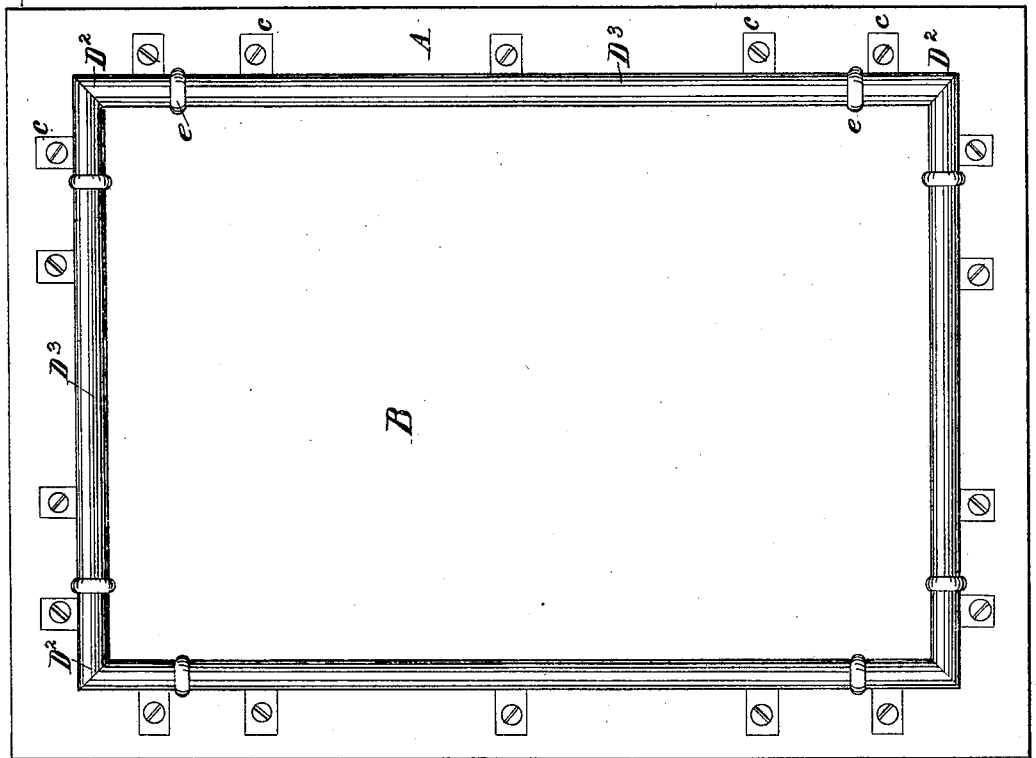
Witnesses:
Inventor:

United States Patent Office.

A. K. EDDOWES, OF PHILADELPHIA, PENNSYLVANIA.

Letters Patent No. 73,586, dated January 21, 1868.

IMPROVED WINDOW-SASH.

*The Schedule referred to in these Letters Patent and making part of the same.*

TO ALL WHOM IT MAY CONCERN:

Be it known that I, A. K. EDDOWES, of the city and county of Philadelphia, in the State of Pennsylvania, have invented a new and useful Improvement in Setting Glass, of which the following is a full, clear, and exact description, reference being had to the accompanying drawing, forming part of this specification, and in which—

Figure 1 represents an inside face view of a window-sash or frame, with a plate or sheet of glass secured therein, according to my improvement, and Figure 2 a vertical transverse section of the same.

Similar letters of reference indicate corresponding parts in both figures.

My improvement, while applicable generally to setting window-glass, is more especially designed for securing heavy plate-glass in the sash or frame, and whereby, while it establishes an air and water-tight joint, yet affords every facility for expansion or contraction of the glass in all directions, and protection from injury against any undue jar, pressure, or displacement, thus reducing the liability to leakage, either by the action of frost, or otherwise, which, in the case of large or thick and expensive plates, is an important consideration; said invention also having the advantage of durability as regards the fixtures, and increased facility for removing with dispatch a broken pane or sheet, and insertion of a new one, which, in cold or wet and bad weather, is of no small importance.

In this my invention, as in previous attempts, putty or cement for securing the pane or sheet in the sash or frame is dispensed with, and the glass inserted in a suitable rabbet or groove, somewhat larger in every direction than the glass, which is made to bed against a thin strip or strips of cork, that is not only cheaper than but otherwise preferable to rubber.

My invention also embraces the placing of a soft and pliable substance, such as cork or rubber, under the standing edge of the glass for the latter to rest on, to meet shock or jar; likewise holding the glass to its place by gum or rubber tube or cork packing of cylindrical character, in combination with a grooved moulding or grooved clamps.

Referring to the accompanying drawing, which shows a window-sash or frame having but a single pane or sheet of plate-glass, but which might be made up of several panes, A represents the frame, rabbeted, as at $a$, to not only of a considerably greater depth than the thickness of the glass B, but also of greater width around all the sides than necessary to receive the pane, so as to give room for expansion throughout, or in direction of the plane of it, or edgewise, as it may be termed. C is a strip of cork, placed within the rabbet $a$ for the glass to bed against, the same, while being cheaper than rubber, having a firmness, combined with a softness and flexibility, that renders it a superior material for the purpose. There may also be arranged in the lower portion of the rabbet $a$, a strip, $b$, of soft and flexible substance, such a scork or rubber, for the standing edge of the glass to rest upon to meet shock or jar.

To secure the glass to its place, with freedom for expansion and contraction in every direction, without rattle, and in a manner that will establish an air and water-tight joint, I insert in the rabbet $a$, a gum or rubber tube, D, or it may be a cylinder of cork, $D^1$, arranged to border the whole rabbet, and made up of any number of lengths or sections, and secure or hold such packing to its place, and so as to make it bear or press upon the glass, with more or less force, by a suitable clamp, which may be a grooved moulding where made of wood, or semicircular or grooved metal clamp, secured to the frames A by feet and screws therethrough, as at $c$. I prefer, however, to make this clamp of semicircularly-grooved corner-bars $D^2$, which, being of a right-angled construction or shape, may be made to answer for windows of different sizes, and form the same with lap-joints $e$ at their ends, so that for windows of different lengths and widths, it will only be necessary to introduce intermediate grooved clamping-bars $D^3$ of any suitable length, and connect them by lapping joint with the corner-bars. This forms a light but stable construction of clamp, giving stiffness at the lap, so that a less number of holding-feet $c$ will suffice, and affording every facility for putting in or taking out the glass without employing skilled labor.

What I here claim, and desire to secure by Letters Patent, is—

1. The hollow or solid cylindrical flexible packing D or $D^1$, and grooved clamp or moulding $D^2$, in combination with the rabbeted frame A, for securing the glass in said frame, essentially as shown and described.

2. The arrangement, within the rabbet $a$, of a strip or bearing, $b$, made of a soft and pliable material, such as gum or cork, for the standing edge of the glass to rest upon, essentially as specified.

A. K. EDDOWES.

Witnesses:
JOSEPH G. HIBBS,
JAMES S. SMITH.